A. M. HAVENS.
COMBINED CLEVIS AND CLIP.
APPLICATION FILED OCT. 25, 1911.
1,022,941.
Patented Apr. 9, 1912.
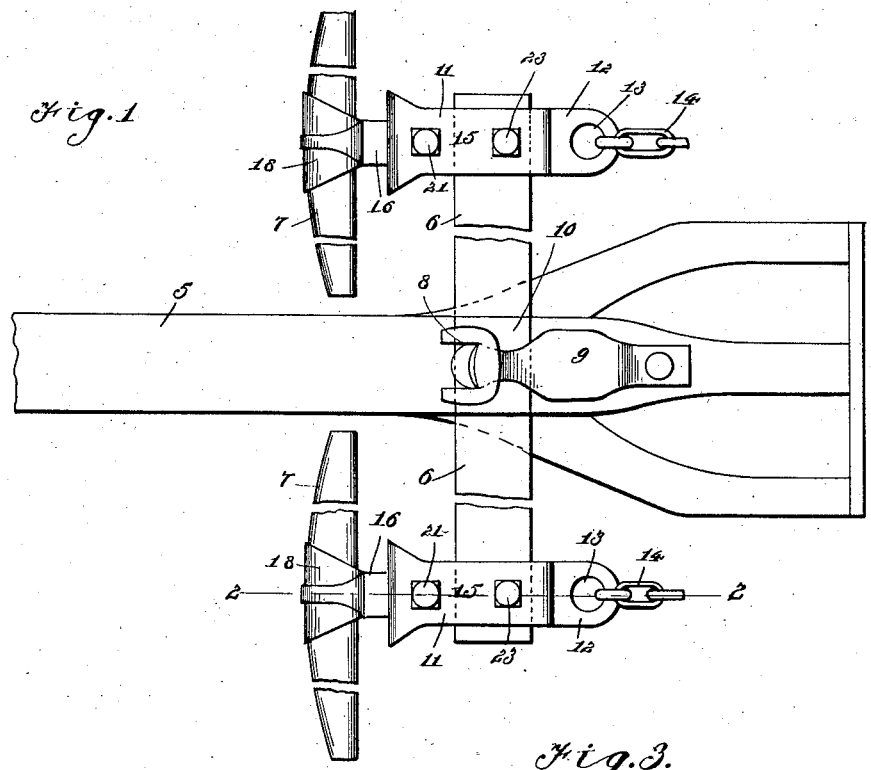
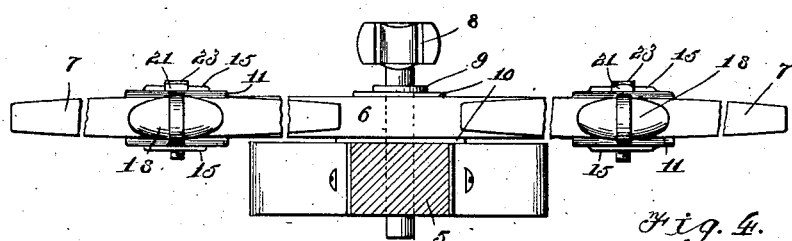
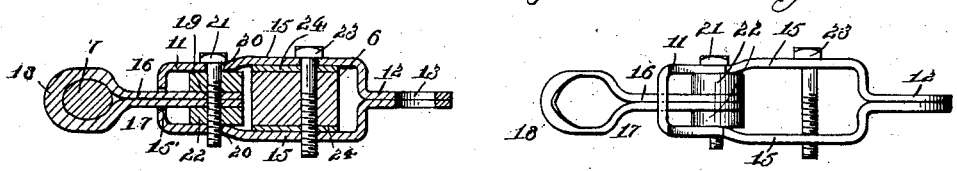
Inventor
Amos M. Havens.
Witnesses
By Victor J. Evans
Attorney
COLUMBIA PLANOGRAPH CO., WASHINGTON, D. C.

UNITED STATES PATENT OFFICE.

AMOS M. HAVENS, OF LOWELL, MICHIGAN.

COMBINED CLEVIS AND CLIP.

1,022,941. Specification of Letters Patent. Patented Apr. 9, 1912.

Application filed October 25, 1911. Serial No. 656,712.

*To all whom it may concern:*

Be it known that I, AMOS M. HAVENS, a citizen of the United States, residing at Lowell, in the county of Kent and State of Michigan, have invented new and useful Improvements in Combined Clevises and Clips, of which the following is a specification.

The invention relates to a combined clevis and whiffle tree clip, and has for its primary object to provide an attachment of this character in which the swingle trees will be held against sagging and that will have free movement, so as to permit the swingle trees to swing incident to the travel of the animals hitched thereto.

Another object of the invention is the provision of a combination clevis and clip which is simple in construction, strong, durable, thoroughly reliable and efficient in its purpose, and inexpensive in manufacture.

With these and other objects in view, the invention consists in the construction, combination and arrangement of parts, as will be hereinafter more fully described, illustrated in the accompanying drawings and pointed out in the claims hereunto appended.

In the drawings: Figure 1 is a fragmentary top plan view of a draft pole, showing the double tree mounted thereon with the combined clevises and clips carried thereby constructed in accordance with the invention. Fig. 2 is a sectional view on the line 2—2 of Fig. 1. Fig. 3 is a front elevation. Fig. 4 is a side elevation of the combined clevis and clip removed from the double tree.

Similar reference characters indicate corresponding parts throughout the several views of the drawings.

Referring to the drawings by numerals, 5 designates a portion of a draft pole which may be of any desirable construction, 6 the whiffle tree, and 7 the swingle trees, the whiffle tree 6 being pivotally connected to the draft pole 5 by means of a removable pin 8, the same being passed through a strap iron 9 fixed to the said pole, and also through a suitable central aperture formed in the whiffle tree and pole, the opposite faces of the whiffle tree, concentrically about the central perforation therein, being provided with wearing plates 10, the same being secured thereto in any suitable manner.

Carried at opposite ends of the whiffle tree 6, are combined clevises and clips, each comprising a rectangular shaped yoke 11 formed from a metallic strip, the ends being inwardly and outwardly bent to provide contacting parallel rearwardly extending ears 12 containing registering openings 13 for receiving the link of a hold-fast chain or other connection 14, the side cheeks 15 of the yoke 11 being flat and disposed at opposite sides of the whiffle tree 6, the front or forward end of the yoke being provided with an elongated slot 15′, through which are passed the flat parallel ends 16 of a clip 17, the medial portion of which is in the form of a sleeve 18 which tightly embraces the swingle tree 7, medially thereof. The ends of the clip 17 are provided with alining openings 19 which register with alining threaded openings 20 in the cheeks 15, and passed through these openings is a pivot screw 21, the same being engaged in the threaded openings 20 in the side cheeks of the yoke. Surrounding the screw 21 and disposed between the ends of the clip 17 are washers 22, which latter prevent displacement of the ends of the slip in the yoke, while the said flat ends passed through the slot 15′ in the yoke avoid the possibility of the wabbling of the swingle tree, but by reason of the pivotal connection of the clip with the yoke, the said swingle tree will swing in an arc incident to the draft of the animals when hitched thereto and pulling a load.

Passed through the cheeks 15 of the yokes and through a suitable opening in the whiffle tree 6 are pivot pins 23 which swingingly connect the yokes to the ends of the whiffle tree.

Fixed to the opposite faces of the whiffle tree and contacting with the inner faces of the yokes 11 mounted upon the whiffle tree 6 are wearing plates 24 which prevent the yokes from cutting into or damaging the whiffle tree when in use.

What is claimed is:

1. A combined clevis and clip, comprising a yoke adapted to embrace a whiffle tree and having a slot in its forward closed end, a clip adapted to embrace a swingle tree and having its ends passed through the slot in the yoke, a pivot mounted in the yoke and engaging the ends of the said clip, and a pivot passed through the yoke and engaged in the said whiffle tree.

2. A combined clevis and clip, comprising a yoke adapted to embrace a whiffle tree and having a slot in its forward closed end, a clip adapted to embrace a swingle tree and having its ends passed through the slot in the yoke, a pivot mounted in the yoke and engaging the ends of the said clip, a pivot passed through the yoke and engaged in the said whiffle tree, and perforated ears projecting outwardly from the rear end of said yoke.

In testimony whereof I affix my signature in presence of two witnesses.

AMOS M. HAVENS.

Witnesses:
R. W. SLAYTON,
T. A. MURPHY.

Copies of this patent may be obtained for five cents each, by addressing the "Commissioner of Patents, Washington, D. C."